No. 773,917. PATENTED NOV. 1, 1904.
W. L. BLISS.
SYSTEM OF ELECTRICAL DISTRIBUTION.
APPLICATION FILED FEB. 3, 1902.
NO MODEL.
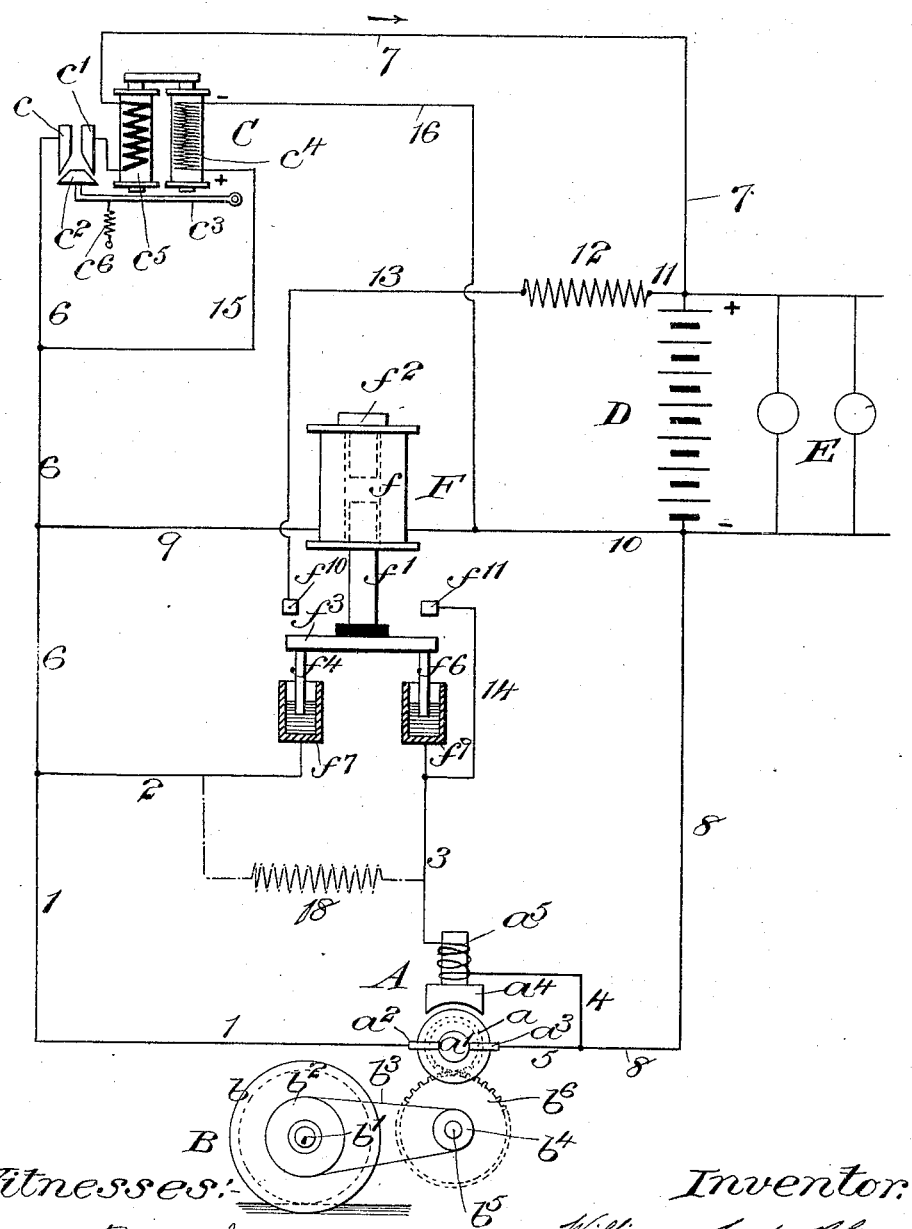

No. 773,917.

Patented November 1, 1904.

UNITED STATES PATENT OFFICE.

WILLIAM LORD BLISS, OF BROOKLYN, NEW YORK, ASSIGNOR TO BLISS ELECTRIC CAR LIGHTING COMPANY, OF NEW YORK, N. Y., A CORPORATION OF NEW JERSEY.

SYSTEM OF ELECTRICAL DISTRIBUTION.

SPECIFICATION forming part of Letters Patent No. 773,917, dated November 1, 1904.

Application filed February 3, 1902. Serial No. 92,407. (No model.)

*To all whom it may concern:*

Be it known that I, WILLIAM LORD BLISS, a citizen of the United States, and a resident of the borough of Brooklyn, in the city and State of New York, have invented a new and useful System of Electrical Distribution, of which the following is a specification.

The object of my invention is to provide a system of electrical distribution comprising a primary generator, a receiving-circuit—such, for instance, as a storage battery—and means under the control of the receiving-circuit for automatically reducing the charging effect of the generator when the circuit is charged to a predetermined point, the said means being also under the control of the operation of the generator for automatically restoring the generator to its normal operative electrical condition.

The system is particularly useful wherein translating devices are supplied with electrical energy by means of a storage battery and a working circuit connected with a dynamo-electric machine or generator whose function is to supply the said working circuit with electrical energy and also to charge the said storage battery. Systems of this nature are found especially in the electric lighting of railway-cars, wherein a dynamo driven from the car-axle furnishes the electrical energy for operating the translating devices and for charging the storage battery, which in turn supplies the electrical energy necessary to operate the said translating devices whenever for any reason the dynamo is unable to do so. In systems of this character it is usual to provide an automatic switch for closing the circuit between the dynamo and storage battery when it is desired to charge the battery, which switch will open the said circuit when otherwise the storage battery would discharge through the dynamo. Such a switch should operate when the voltages of the dynamo and battery are approximately equal, closing the circuit for an increasing dynamo voltage and opening the circuit for a decreasing dynamo voltage. It is therefore desirable that such a switch should be controlled directly by the dynamo voltage and not by some other quantity—such, for instance, as speed, field-current, &c.—which may or may not be functions of the dynamo voltage. A simple and reliable switch of this character is set forth in United States Letters Patent granted to me the 8th day of December, 1896, No. 572,627. In general, the dynamo voltage is mainly dependent on the dynamo speed, and as this speed in electric-car-lighting work varies from zero to maximum very frequently the operation of the dynamo is extremely intermittent, and therefore if the translating devices are to be operated continuously or at will the dynamo must, in addition to supplying the translating devices with electrical energy while the said dynamo is running at sufficient speed to enable it to do so, store electrical energy in the storage battery to supply the translating devices whenever the dynamo runs below an operative speed or stops entirely. In adjusting the apparatus to provide for sufficient charging of the battery to meet the requirements of all kinds of service it frequently happens that the batteries become overcharged, which is an undesirable condition, as it results in the excessive deterioration of the batteries. I have therefore in this invention provided a simple and automatic device whereby when the charging process is continued as long as desirable and the batteries are fully charged the dynamo is rendered to a certain extent inoperative and ceases to charge the batteries, although it may or may not continue to supply the translating devices.

The accompanying drawing represents a system of electrical distribution embodying my invention.

A dynamo is represented conventionally at A, and the mechanical means for driving the same by B. The automatic switch is denoted by C, the storage battery by D, and the translating devices by E. These several devices may be of any well-known or approved construction.

$a$ represents the armature of the dynamo A; $a'$, the commutator; $a^2 a^3$, the two commutator-brushes; $a^4$, the field-magnet, and $a^5$ the energizing-coil.

The means for driving the dynamo which I have represented herein consist of a car-wheel $b$, having its axle $b'$ provided with a pulley $b^2$, around which passes a driving-belt $b^3$, which also passes around a pulley $b^4$ on an intermediate shaft $b^5$, having a gear $b^6$ connecting with a gear on the dynamo-armature shaft.

The automatic switch C consists of the contact-blocks $c$ $c'$, contact-wedge $c^2$, armature $c^3$, lifting-coil $c^4$, and releasing-coil $c^5$. The lifting-coil $c^4$ is composed of a fine wire of high resistance connected across the terminals or brushes $a^2 a^3$ of the dynamo. The releasing-coil $c^5$ consists of a few turns of coarse wire and is connected directly in series with the dynamo A and storage battery D. A retractile spring $c^6$ may be provided for yieldingly holding the armature in its open position.

My improved cut-off device is denoted as a whole by F. The solenoid of the cut-off device is denoted by $f$, and it is composed of fine wire connected across the terminals or brushes $a^2 a^3$ of the dynamo A. The solenoid contains a movable core $f'$ and a stationary core $f^2$. A bar $f^3$ is attached to but insulated from the movable core $f'$, which bar is provided with contact-pins $f^4 f^6$, arranged to engage and disengage cups of mercury $f^7 f^9$.

Supplementary contact-blocks $f^{10} f^{11}$ are arranged in position to be electrically connected by the bar $f^3$ when the movable core $f'$ is raised by the energization of the solenoid $f$. When the bar $f^3$ is in contact with said supplementary contact-blocks $f^{10} f^{11}$, the pins $f^4$ $f^6$ are lifted out of electrical contact with the mercury-cups $f^7 f^9$.

The dynamo being connected as a self-exciting shunt-machine, the current for exciting its field is generated in the armature $a$ and traverses the following circuit: from positive brush $a^2$, through wire 1, wire 2, cup $f^7$, pin $f^4$, bar $f^3$, pin $f^6$, cup $f^9$, wire 3, field-magnet coil $a^5$, wire 4, wire 5, to negative brush $a^3$. If the armature $a$ suffer reversal in its direction of rotation, as it would in car-lighting work, the polarity of the brushes $a^2$ and $a^3$ may be preserved by means of the device patented by me September 11, 1894, Patent No. 525,836. As soon as the dynamo A generates a voltage equal to that of the storage battery D the lifting-coil $c^4$ of the automatic switch C lifts the armature $c^3$ against the force of the retractile spring $c^6$ and causes the wedge $c^2$ to make an electrical connection between the blocks $c$ $c'$. A slight increase in the dynamo voltage above the storage-battery voltage will cause the main current to traverse the following circuit: from dynamo-commutator $a$, brush $a^2$, through wire 1, wire 6, block $c$, wedge $c^2$, block $c'$, releasing-coil $c^5$, wire 7, battery D, wire 8, wire 5, and brush $a^3$, to dynamo-commutator $a$. The releasing-coil $c^5$ of the switch C is so connected that when the current flows from the dynamo to the battery in the direction of the arrow the said coil $c^5$ assists the lifting-coil $c^4$ and securely holds the wedge $c^2$ of the armature $c^3$ in contact with the blocks $c$ $c'$. When the voltage of the dynamo falls below the battery voltage, the current will flow from the battery through the dynamo in a direction opposite to that indicated by the arrow, and in this case the releasing-coil $c^5$ of the automatic switch C will oppose the lifting-coil $c^4$ with sufficient strength to cause the release of the armature $c^3$, thus breaking the connection between the blocks $c$ $c'$. A small reverse-current only is necessary to cause the release of the armature $c^3$ for breaking the circuit.

Let it be assumed that the dynamo A is generating a current and is charging the storage battery D, the switch C being closed, and that the current which is flowing through the storage battery is the "normal" charging-current, as prescribed by the manufacturers of the battery. In car-lighting systems the normal charging-current is caused to flow through the battery when the train is moving at an average running speed. After charging the battery for a certain length of time at the normal rate the voltage at the terminals of the battery or the dynamo is a good indication of the state of the battery, and when said voltage is about 2.4 volts per cell the battery may be said to be fully charged. The solenoid $f$ of the cut-off F is subjected at all times to the terminal voltage of the dynamo A and also when the switch C is closed to the terminal voltage of the battery D, which is now equal to that of the dynamo, through the wires 9 and 10, and when the said battery voltage has risen to a value of about 2.4 volts per cell the core $f'$ of the solenoid $f$ is drawn upwardly, thus lifting the pins $f^4 f^6$ out of the mercury-cups $f^7 f^9$. This operation causes the field-circuit of the dynamo to be broken at the pins $f^4 f^6$. This would result in destroying the magnetism of the field-magnet $a^4$ of the dynamo and would reduce the voltage of the dynamo to zero were it not for the fact that the bar $f^3$, carried by the movable core of the solenoid, makes an electrical connection between the supplementary contact-blocks $f^{10} f^{11}$, thus establishing a current from the + pole of the storage battery D, through wire 11, resistance 12, wire 13, block $f^{10}$, bar $f^3$, block $f^{11}$, wire 14, wire 3, coil $a^5$, wire 4, and wire 8 to the − pole of the storage battery D. This current energizes the field-magnet coil $a^5$ to any degree desired and enables the dynamo to produce any desired voltage up to its maximum.

In practice I have found it desirable so to adjust the resistance 12 that the dynamo voltage shall be reduced to a little less than that required to close the switch C. Under these conditions the switch C will automatically open in precisely the same manner as heretofore described.

The lifting-coil $c^4$ of the switch C is ordinarily connected to the dynamo-terminals by a wire 15 leading from its + end to the wire 6 and a wire 16 leading from its —end to the wire 10. When the circuit through the lifting-coil $c^4$ of the switch C is broken, the switch C will open, thus breaking the main current flowing through the wire 7 without requiring the reverse-current to pass therethrough, as in the case where the lifting-coil $c^4$ remains energized. As has been stated, the resistance 12 is so adjusted that after the operation of the cut-off F the voltage of the dynamo would be reduced to a little less than that required to close the switch C; but it is great enough to hold the movable core $f'$ of the solenoid $f$ raised, so as to keep a connection between the blocks $f^{10}$ $f^{11}$, through the bar $f^3$. If the supplementary contact-blocks $f^{10}$ $f^{11}$ had not been utilized, the dynamo voltage would have fallen to zero every time the field-circuit was broken at the cut-off and the solenoid $f$ would have released the movable core $f'$ and again reëstablished the field-circuit. The dynamo would now excite itself, the switch C would close, and the charging process would continue, which is exactly what it is desired to prevent. In fact, this cycle of operations might be repeated over and over again were it not for the fact that the dynamo was not made wholly inoperative by breaking the field-circuit by the lifting of the pins $f^4$ and $f^6$ out of their respective mercury-cups $f^7$ and $f^9$ and the furnishing of a separate and independent field excitation from the battery by the contact of the bar $f^3$ and the contacts $f^{10}$ and $f^{11}$.

It might be suggested that the supplementary contacts $f^{10}$ $f^{11}$ be dispensed with and a resistance connected between the mercury-cups $f^7$ and $f^9$, which would be normally short-circuited by the pins $f^4$ and $f^6$ dipping into the mercury in their respective cups. When these pins were lifted out of their cups, the resistance mentioned would be thrown into the field-circuit and the dynamo would be rendered inoperative to a certain degree, as before. The objection to this arrangement is that the dynamo still acting as a self-excited machine with a large resistance in its field, which would consequently be very weak, would be in general quite unstable, and the voltage of the dynamo might with a slight reduction in speed less than planned for suddenly vanish and prematurely effect the restoration of the cut-off F. The supplementary contacts and the switching over from self to separate excitation is an expedient simply to secure stability.

There are many indirect methods of rendering the dynamo to a certain extent inoperative; but all require an ultimate reduction of the field strength, and in connection with all such methods my invention is with slight modification applicable. Its scope is therefore not limited by the arrangement of circuits herein shown.

The cut-off F is restored to its normal position by an additional reduction of the voltage in the dynamo to a predetermined point. This reduction is obtained by the reduction in the speed with which the dynamo is driven by the mechanical means which in the accompanying drawing I have represented as a car-axle. When the train stops or slows down to a predetermined degree, the voltage in the dynamo will also fall to such a point that the solenoid will no longer be able to hold the bar $f^3$ in contact with the blocks $f^{10}$ $f^{11}$. The bar will then fall and reëstablish the original field-circuit.

The time that the charging process is discontinued is the time that elapses from the instant that the field-circuit is broken to the instant that the field-circuit is again reëstablished at the cut-off caused by the reduction in the speed of the mechanical driving means for the dynamo. When this system is used in connection with car-lighting, the time that the charging is discontinued may be longer or shorter as the conditions vary. If the cut-off is operated shortly after the car has started on a long run during which there is no such slackening of speed as would cause the restoration of the cut-off, the voltage in the storage battery would be slowly reduced, the capacity of the battery being sufficient to continue the operation of the translating devices during the longest run made by the train. The solenoid may be so adjusted that the cut-off may be restored with a very slight additional reduction of the dynamo voltage, so that the slowing up of the train—such as would occur when the locomotive is taking water from the track-tanks, when the train is ascending grades, or when it is passing through towns—will restore the cut-off, thus preventing the exhaustion of the batteries during a long run of the train.

By adjusting the resistance 12 any degree or period of inactivity can be secured. The dynamo may be rendered inoperative as far as charging the battery is concerned; but the switch C might still remain closed, whereby the dynamo could carry any portion of the lamp load desired. The resistance 12 may also be so adjusted that the dynamo would be caused only partially to discontinue charging the battery while it still carries the lamp load.

What I claim is—

1. In a system of electrical distribution, a primary generator, means for driving it, a storage battery, means for automatically reducing the electrical energy which the said generator supplies to the said storage battery when the storage battery is fully charged, and means under the control of the generator-driving mechanism, for restoring the generator to its normal operative condition, substantially as set forth.

2. In a system of electrical distribution, a primary generator, means for driving it, a storage battery, means under the control of the storage battery for automatically reducing the electrical energy which the said generator supplies to the said storage battery when the receiving-circuit is fully charged, and means under the control of the generator-driving mechanism for restoring the generator to its normal operative condition, substantially as set forth.

3. In a system of electrical distribution, a primary generator, means for driving it, a storage battery, means under the control of the storage battery for automatically reducing the charging effect of the generator when the storage battery is fully charged, and means under the control of the generator-driving mechanism for restoring the generator to its normal operative condition, substantially as set forth.

4. In a system of electrical distribution, a primary generator, means for driving it, a storage battery, means under the control of the storage battery for reducing the electrical energy which said generator supplies to the said storage battery when the storage battery is charged to a predetermined point, and means under the control of the generator-driving mechanism for restoring the generator to its normal operative condition, substantially as set forth.

5. In a system of electrical distribution, a primary generator, means for driving it, a storage battery, means under the control of the storage battery for automatically reducing the charging effect of the generator when the storage battery is charged to a predetermined point, and means under the control of the generator-driving mechanism for restoring the generator to its normal operative condition, when the speed of the generator-driving mechanism reaches a predetermined point, substantially as set forth.

6. In a system of electrical distribution, a primary generator, means for driving it, a storage battery, means under the control of the storage battery for automatically reducing the charging of the same by the generator, when the battery is charged to a predetermined point, and means under the control of the generator-driving mechanism for restoring the generator to its normal operative condition, substantially as set forth.

7. In a system of electrical distribution, a primary generator, means for driving it, a storage battery, a translating device, means under the control of the storage battery for automatically reducing the charging of the battery by the generator when the battery is charged to a predetermined point, and means under the control of the generator-driving mechanism for restoring the generator to its normal operative condition, substantially as set forth.

8. In a system of electrical distribution, a primary generator, means for driving it, a storage battery, a translating device, means under the control of the storage battery for automatically reducing the charging of the storage battery by the generator when the battery is charged to a predetermined point, and means also under the control of the generator-driving mechanism for restoring the generator to its normal operative condition, when the speed of the generator-driving mechanism reaches a predetermined point, substantially as set forth.

9. In a system of electrical distribution, a primary generator, a storage battery, means under the control of the storage battery for automatically reducing the charging of the storage battery by the generator when the storage battery is charged to a predetermined point, and means under the control of the operation of the generator for automatically restoring the generator to its normal operative condition, substantially as set forth.

10. In a system of electrical distribution, a primary generator, a storage battery, means for automatically changing the normal electrical condition of the primary generator, when the battery is charged to a predetermined point, for requiring a reduction in the supply of electrical energy, and means under the control of the operation of the primary generator for restoring the generator to its normal operative condition, substantially as set forth.

11. In a system of electrical distribution, a primary generator, means for driving it, a storage battery, means under the control of the storage battery for automatically reducing the charging of the storage battery by the generator when the storage battery is charged to a predetermined point, and means under the control of the mechanism for driving the generator whereby the generator will be restored to its normal operative electrical condition, whenever the speed of the generator-driving mechanism is lowered to a predetermined point, substantially as set forth.

In testimony that I claim the foregoing as my invention I have signed my name, in presence of two witnesses, this 22d day of January, 1902.

WILLIAM LORD BLISS.

Witnesses:
 FREDK. HAYNES,
 C. S. SUNDGREN.